United States Patent
Sikri

(10) Patent No.: US 9,514,018 B2
(45) Date of Patent: Dec. 6, 2016

(54) SCALING FRAMEWORK FOR QUERYING

(71) Applicant: Software AG, Darmstadt (DE)

(72) Inventor: Mohit Sikri, Bangalore (IN)

(73) Assignee: Software AG, Darmstadt (DE)

( * ) Notice: Subject to any disclaimer, the term of this patent is extended or adjusted under 35 U.S.C. 154(b) by 370 days.

(21) Appl. No.: 14/166,009

(22) Filed: Jan. 28, 2014

(65) Prior Publication Data

US 2015/0213087 A1    Jul. 30, 2015

(51) Int. Cl.
G06F 17/30    (2006.01)
G06F 11/30    (2006.01)
G06F 9/50    (2006.01)

(52) U.S. Cl.
CPC .............. *G06F 11/30* (2013.01); *G06F 9/5061* (2013.01); *G06F 17/30442* (2013.01)

(58) Field of Classification Search
CPC .................................................. G06F 17/30442
USPC ........................................................ 707/713
See application file for complete search history.

(56) References Cited

U.S. PATENT DOCUMENTS

| | | | |
|---|---|---|---|
| 2005/0138047 A1* | 6/2005 | Liu ...................... | G06F 17/3092 |
| 2011/0078303 A1* | 3/2011 | Li ......................... | G06F 9/505 |
| | | | 709/224 |
| 2011/0289549 A1* | 11/2011 | Raup .................. | G06F 21/6245 |
| | | | 726/1 |
| 2012/0222005 A1 | 8/2012 | Harris et al. | |
| 2013/0174168 A1* | 7/2013 | Abuelsaad ............ | G06F 9/5072 |
| | | | 718/102 |
| 2015/0089064 A1* | 3/2015 | Salle .................... | H04L 47/125 |
| | | | 709/226 |

OTHER PUBLICATIONS

"Autoscaling," https://scalr-wiki.atlassian.net/wiki/display/doc/Autoscaling, 3 pages (retrieved Jan. 28, 2014).
"Cloud Design and Configuration," Right Scale, http://www.rightscale.com/products/configuration-framework.php, 10 pages (retrieved Jan. 28, 2014).
Roy, N., et al., "Efficient Autoscaling in the Cloud Using Predictive Models for Workload Forecasting," http://www.dre.vanderbilt.edu/~gokhale/WWW/papers/Cloud11_Autoscaling.pdf, 8 pages (retrieved Jan. 28, 2014).
Calcavecchia, N. M., et al., "DEPAS: A Decentralized Probabilistic Algorithm for Auto-Scaling," Technical Report N.2012.5, Feb. 10, 2012, http://arxiv.org/pdf/1202.2509v1.pdf, 30 pages (retrieved Jan. 28, 2014).

(Continued)

*Primary Examiner* — Joshua Bullock
(74) *Attorney, Agent, or Firm* — Nixon & Vanderhye PC

(57) ABSTRACT

Certain example embodiments described herein relate to techniques for scaling processing systems. For instance, in certain example embodiments, a scaling master receives a user-specified scaling and/or alerting query. The scaling and/or alerting query is transmitted to scaling agents at respective ones of the processing elements, the transmission using the connection layer. Each of the scaling agents executes the at least one scaling and/or alerting query. Each of the scaling agents reports a result of the executing to the scaling master using the connection layer. The scaling master forms a scaling decision based on the result reported by each of the scaling agents.

20 Claims, 14 Drawing Sheets

(56) References Cited

OTHER PUBLICATIONS

"Auto Scaling Developer Guide" API Version Jan. 1, 2011, http://awsdocs.s3.amazonaws.com/AutoScaling/latest/as-dg.pdf, 256 pages (retrieved Jan. 28, 2014).
Bunch, C., et al., "A Pluggable Autoscaling Service for Open Cloud PaaS Systems," http://www.cs.ucsb.edu/~ckrintz/papers/ucc12.pdf, 4 pages (retrieved Jan. 28, 2014).

\* cited by examiner

```
// Query received from the master via SCQL Connection layer.
String scqlQuery = "<query from the master>";
// Unique ID for the agent, to be set by the user in configuration file.
String nodeID = "<node identifier>";

// Initialize the compiler.
SCQueryCompiler compiler = new SCQueryCompiler();
try {
// Compile the query. It internally calls lexar, parser, semantic analyzer
String compiledQuery = compiler.compileScalingQuery(nodeID,
scqlQuery);
// Initialize the code generator.
CompositeGenerator cgen = new XMLCompositeGenerator();

ByteArrayInputStream bais_pdXML_compiled = new ByteArrayInputStream(
compiledQuery.getBytes());
// Generate the object code.
Map<String, Composite> compositeMap = cgen.generateConposite(
bais_pdXML_compiled, nodeID);

Entry<String, Composite> mapEntry = compositeMap.entrySet()
.iterator().next();
// Initialize the SCQL runtime which executes the object code.
CompositeEvaluator compEval = new CompositeEvaluator(
mapEntry.getValue(), mapEntry.getKey());
// Start the computation.
compEval.start();

log.info("query execution in-progress...");
// Wait for the runtime to finish.
compEval.join();
log.info("query result :"+compEval.evaluationResult());

} catch (ScalingQLCompilerException e) {
log.error("Error while compiling the query.", e);
} catch (Exception e) {
log.error("Error processing the query.", e);
}
```

```
// Connection properties for connecting to agent.
Properties connectionProperties = new Properties();

//As applicable to zookeeper based SCQL connection layer implementation
connectionProperties.put("zkConnectStr", "127.0.0.1:2181");
connectionProperties.put("zkSessionTimeout", "1200000");
connectionProperties.put("zkNodeID", "testNode1");

String query = "DO SCALEDOWN WHEN (AVG(SYSTEM.CPU) < 56 RECORDDURATION = 10 METRICSOURCE = JMX" +
" [ METRICSOURCEPROPS (ObjectName = 'java.lang:type=OperatingSystem', JmxURL = 'service:jmx:rmi://localhost' ))";

SCQLConnection connection = null;

try {
    // Initialize the driver.
    SCQLDriver driver = new ZKDriverImpl();

//Get the connection to the agent.
    connection = driver.connect(connectionProperties);

// Register a callback and execute the query.
    connection.executeQuery(query, new SCQLResultCallback() {
        // Invoked when agent sends the query result back.
        public void onResponseReceived(SCQLResultSet response) {
            if(response.isResultSetEmpty()){
                log.info("Scaling result of the query : "+response.getScalingResult());
                log.info("Average system CPU load : "+response.getValue("SYSTEM.CPU"));
            }
        }
        // Invoked when agent is not able to process the query.
        public void onErrorReceived(Exception response) {
            log.error("Agent not able to process the query.", response);
        }
    });
}
// SCQLException represents any error in SCQL connection layer.
catch (SCQLException e) {
    log.error("Error while executing query.", e);
}
finally {
    // Close the connection.
    if(connection!=null){
        try {
            connection.close();
        } catch (SCQLException e) {
            log.warn("SCQL connection could not be closed.", e);
        }
    }
}
```

602 — 604 — 606 — 608 — 610

```
final AtomicBoolean isSuccessful = new AtomicBoolean();
final StringBuilder queryID = new StringBuilder();

/* Register a callback and request for scheduling the query based
 * on cron expression. For example run it every 10 minutes
 */
SCQLResultStream dataStream = connection.scheduleQuery(query, "0 0/10 * * * *", new SCQLResultCallback() {  ⎤

/* Invoked when agent successfully accepts the query and send the    ⎥ 704
     * scheduled query identifier.
     */
    public void onResponseReceived(SCQLResultSet response) {
        if(!response.isResultSetEmpty()){
            isSuccessful.set(true);
            queryID.append(response.getValue("queryID"));
            log.info("Query Identifier : "+queryID);
        }
    }

// Invoked when agent is not able to process the scheduled query.
    public void onErrorReceived(Exception response) {
        isSuccessful.set(true);
        log.error("Agent not able to process the query.",response);
    }
});

/* wait for result callback invocation to check if query execution
 * is a success or not
 */
wait1();
if(isSuccessful.get()){
    /* wait for query result data to be available in the stream    ⎤
     * using dataStream.isDataAvailable()                           ⎥
     */                                                            ⎥
    wait2();                                                       ⎥
                                                                   ⎥ 706
    /* invoke the flow and open loop control mechanism              ⎥
     * for controlled and effective scaling.                        ⎥
     */                                                            ⎥
    flowAndLoopControl(dataStream, Mode.OPEN, thresholdValue);     ⎦

//disconnect from stream.
    dataStream.disconnect();
}
```

```
//stop the query given it's identifier
connection.stopQuery(queryID.toString(), new SQLResultCallback() {
    @Override
    public void onResponseReceived(SQLResultSet response) {
        log.info("successfully stopped the query : "+queryID);
    }

@Override
    public void onErrorReceived(Exception response) {
        log.error("Error while stopping the query : "+queryID,response);
    }
});
```

```
<?xml version="1.0" encoding="UTF-8"?>
<scaling-policy>
    <scaleUP nodeID="testNode" query = "DO SCALEUP WHEN (AVG(SYSTEM.MEM) = 20 RECORDDURATION = 10 METRICSOURCE = SigarLib)"/>
    <scaleDown nodeID="testNode" query = "DO SCALEDOWN WHEN (MAX(APPLICATION.DBLoad) <= 10 APPID = 'TestApp'
        RECORDENTRIES = 25 METRICSOURCE = JMX[ METRICSOURCEPROPS
        (ObjectName = 'com.test:type=CustomMetricInfo', JmxURL = 'service:jmx:rmi://localhost' )])"/>
    <scaleUP nodeID="testModel" query = "DO SCALEUP WHEN (AVG(SYSTEM.CPU) = 40 RECORDDURATION = 10 METRICSOURCE = SigarLib)"/>
    <scaleDown nodeID="testModel" query = "DO SCALEDOWN WHEN (MAX(APPLICATION.UserRequests) <= 10 APPID = 'TestApp'
        RECORDENTRIES = 25 METRICSOURCE = JMX[ METRICSOURCEPROPS
        (ObjectName = 'com.test:type=CustomMetricInfo', JmxURL = 'service:jmx:rmi://localhost' )])"/>
</scaling-policy>
```

FIG. 10

```
<?xml version="1.0" encoding="UTF-8"?>
<alert-policy>
    <alert nodeID="testNode" query = "DO ALERT AS WARNING WHEN (AVG(SYSTEM.MEM) >= 100
    RECORDDURATION = 60 METRICSOURCE = SigarLib)"/>
    <alert nodeID="testNode1" query = "DO ALERT AS NORMAL WHEN (MAX(APPLICATION.DBLoad) <= 10
    APPID = 'TestApp' RECORDENTERIES = 100 METRICSOURCE = JMX{ METRICSOURCEPROPS
    (ObjectName = 'com.test:type=CustomMetricInfo', JmxURL = 'service:jmx:rmi://localhost' )])"/>
</alert-policy>
```

FIG. 11

```
Request URL: http://127.0.0.1:8888/handle
Request Method: POST
Request Payload:

<?xml version="1.0" encoding="utf-8"?>
<!--Request type, other options are clear-counters, reload-config -->
<request type="run-simulation">
    <request-params>

<!--Simulation option type, simulate JAVA heap load -->
        <param name = "simulationType">2</param>

<!--Increase JAVA heap load by 10 percent -->
        <param name = "jvmHeapLoadValue">10</param>

<!--Simulation period in minutes -->
        <param name = "jvmHeapDurationValue">4</param>

</request-params>
</request>
```

FIG. 13

```
Request URL: http://127.0.0.1:8888/handle
Request Method: POST
Request Payload:

<?xml version="1.0" encoding="utf-8"?>
<!--Request type, other options are clear-counters, reload-config -->
<request type="run-simulation">
    <request-params>

<!--Simulation option type, simulate JAVA heap load -->
        <param name = "simulationType">2</param>

<!--Increase JAVA heap load by 10 percent -->
        <param name = "jvmHeapLoadValue">10</param>

<!--Simulation period in minutes -->
        <param name = "jvmHeapDurationValue">4</param>

</request-params>
</request>
```

FIG. 14

SCALING FRAMEWORK FOR QUERYING

TECHNICAL FIELD

Certain example embodiments described herein relate to techniques for scaling processing systems having a plurality of processing elements.

BACKGROUND AND SUMMARY OF EXAMPLE EMBODIMENTS OF THE INVENTION

Scalability is an important feature for many systems. Scalability generally refers to the capability to add processing resources (e.g., computers, processors, virtual machines, memory, processes, threads, etc.) to a system such that, for example, the workload (e.g., processing demand) presented to the system can be handled in accordance with certain performance criteria. Performance criteria may include processing delay levels, throughput levels, system and/or processor capacity used, and the like. An example scalable system may be able to add processing elements, such as, for example, web servers, when the incoming workload to a current pool of web servers that serve incoming requests exceeds a first threshold, and to also remove web servers from the pool when the workload drops below a second threshold.

In example scalable systems, alerts may be generated when either the processing resources or the incoming workload reaches certain configured thresholds. For example, an alert may be generated when all processors in the system are at 80% capacity. Alerts are typically intended to warn an operator regarding a condition of the processing system.

In cloud environments, scalability may be even more important than in non-cloud environments. Many techniques are known for achieving scalability and alertness (e.g., ability to generate alerts when system conditions are detected) in cloud management software. Such features are often shipped as a feature (e.g., in the box feature) within hardware and/or software that is sold. Many applications allow for users to configure scale/alert conditions or related parameters using an administrative user interface. For example, Amazon Web Services (AWS) uses the CloudWatch console for defining and generating alarms/alerts. However in AWS, configuring policies for dynamic scaling may involve numerous steps to be performed by the user.

A problem with many of the currently available cloud management software is that the scaling and/or alerting decision logic/module is shipped as a feature within the box (e.g., incorporated into the software and/or hardware) and users (e.g., operator) have limited control over the logic/module, if any. They either provide simple UI-based or complicated commands/APIs-based scaling solution which may not provide for evaluating complex scaling conditions.

Further, many of the currently available cloud management software provide little or no support for implementing and configuring metric sources for custom metrics.

Moreover, many of the currently available cloud management software may not allow for the eviction policy (e.g., policy for evicting processing elements) to be customized, and as a result, may evict processing elements that are not the best suited for being evicted. In many of the currently available systems, no clear indication on how final scaling conclusion is drawn.

Thus, it will be appreciated by those skilled in the art that there is need for improved techniques for providing scalability and/or alerts in processing systems, e.g., in ways that overcome the above-described and/or other problems.

Certain example embodiments provide a scaling engine that may be incorporated into hardware and/or software in order to provide scaling and/or alerting decision services to cloud management platforms. Certain example embodiments may also provide extension points to the scaling engine that may be used to customize various aspects of scalability and alerts such as, for example, implementation of a connection layer between scalability elements, summation policy, eviction policy and metric source can be plugged and powerful as it provides a structured query language.

In certain example embodiments, a scalable system having a plurality of communicatively-coupled processing elements is provided. The system includes at least a scaling master, a plurality of scaling agents, and a connection layer providing one or more interfaces for communication between the scaling master and the plurality of scaling agents over a network. Each scaling agent may be located at a respective one of the plurality of communicatively-coupled processing elements. The scaling master is configured to transmit, using the connection layer, at least one user-specified scaling and/or alerting query to each scaling agent. Each scaling agent is configured to execute the at least one scaling and/or alerting query received from the scaling master, and to report, using the connection layer, a result of the execution to the scaling master. The scaling master is further configured to receive each result and to form a scaling decision based on the results.

According to certain example embodiments, the scaling master may be further configured to receive the at least one scaling and/or alerting query from a user input device or from a configuration file.

According to certain example embodiments, the at least one scaling and/or alerting query may combine plural scaling and/or alerting expressions using one or more conditional operators.

According to certain example embodiments, the scaling master may be further configured to transmit one or more scaling commands based on the formed scaling decision to respective ones of the plurality of scaling agents.

According to certain example embodiments, the scaling master may be configured to form the scaling decision by performing operations including, aggregating the received results, and making the scaling decision based on the aggregated result.

According to certain example embodiments, the scaling master may form the scaling decision by performing operations including selecting the received results for the aggregating based on a flow control operation.

The flow control may be a closed loop flow control, and the scaling decision may be based on reducing a difference between a configured desired metric and a measured metric determined from the selected results, according to certain example embodiments.

The flow control may be an open loop flow control, and the scaling decision may be further based on a configured number of reported results selected during a first predetermined time interval, with respective first predetermined time intervals being separated by a second predetermined time interval, according to certain example embodiments.

According to certain example embodiments, the aggregating may be performed in accordance with a configurable policy.

According to certain example embodiments, the connection layer may include a structured query language, and the at least one scaling and/or alerting query may be specified in the structured query language.

According to certain example embodiments, each scaling agent may be configured to compile the received at least one scaling and/or alerting query, and to execute the compiled query.

According to certain example embodiments, the scaling master may be further configured to calculate a number of processing elements to be evicted to maintain a desired load. The calculating may be based on an average load in the processing elements. The processing elements may be ranked in accordance with a weighted average load, and the processing elements to be evicted are selected in accordance with the ranking.

According to certain example embodiments, the scaling master may be configured to transmit a command to stop the executing of the at least one scalability and/or alerting query. The command may include an identifier for the at least one scaling and/or alerting query.

According to certain example embodiments, the scaling agent may be further configured to schedule the at least one scaling and/or alerting query for subsequent execution at a specified time. The executing of the scheduled at least one scaling and/or alerting query may occur subsequently at the specified time.

In certain example embodiments, a method for scaling a processing system having a plurality of communicatively coupled processing elements is provided. The scaling master receives a user-specified scaling and/or alerting query, and transmits the query to scaling agents at respective ones of the plurality of processing elements using the connection layer. Each scaling agent executes the at least one scaling and/or alerting query, and reports a result of the executing to the scaling master using the connection layer. The scaling master forms a scaling decision based on the result reported by each of the scaling agents.

According to certain example embodiments, the scaling master may transmit one or more scaling commands based on the formed scaling decision to respective ones of the plurality of scaling agents.

According to certain example embodiments, the forming a scaling decision may include aggregating the reported results, and making the scaling determination based on the aggregated result.

According to certain example embodiments, the connection layer may include a structured query language, and the at least one scaling and/or alerting query may be specified in the structured query language.

In certain example embodiments, there is provided a non-transitory computer readable storage medium tangibly storing instructions that, when executed by at least one processor of a system, perform a method for sealing a processing system as described herein. The method may includes, for instance: the scaling master receiving a user-specified scaling and/or alerting query, and transmitting the query to scaling agents at respective ones of the plurality of processing elements using the connection layer. Each scaling agent executes the at least one scaling and/or alerting query, and reports a result of the executing to the scaling master using the connection layer. The scaling master forms a scaling decision based on the result reported by each of the scaling agents.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 5 is a code listing for an example scaling agent for executing a received query in accordance with certain example embodiments;

FIG. 6 is a code listing of a program, or part of a program, to cause the scaling master to execute a query at the scaling location, in accordance with certain example embodiments;

FIG. 7 is a code listing of a program, or part of a program, for causing the scheduling of a query at the scaling location in accordance with certain example embodiments;

FIG. 8 illustrates a code listing of code for the scaling master to stop a query executing on a scaling agent, using a query identifier, in accordance with certain example embodiments;

FIG. 10 illustrates an example scaling policy file in accordance with certain example embodiments;

FIG. 11 illustrates an example alerting policy configuration in accordance with certain example embodiments;

FIG. 13 illustrates a code snippet for running the simulation, in accordance with certain example embodiments; and FIG. 14 illustrates another code snippet for running the simulation, in accordance with certain example embodiments.

DETAILED DESCRIPTION OF EXAMPLE EMBODIMENTS OF THE INVENTION

Certain example embodiments relate to improving scalability and alerting in processing systems. The techniques of certain example embodiments provide simple yet powerful application programming interfaces (APIs) around query/policy for cloud management platforms (e.g., Rightscale, Scalr, etc.). These APIs can make effective scaling and alerting decisions for the topology cloud management platforms (CMP(s)) are managing, hence resulting in a scalable infrastructure.

This may improve the scalability (e.g., cloud bursting) and alerting aspects of the cloud management software and provide more control to users, as it may help decouple the scaling and alerting decision mechanism from rest of cloud management.

Certain example embodiments provide for users to write complex scaling/alerting queries by combining scaling/alerting expressions using conditional operators. Another feature of certain embodiments is that the users can change the scaling/alerting query without any process restart.

Figure 1:
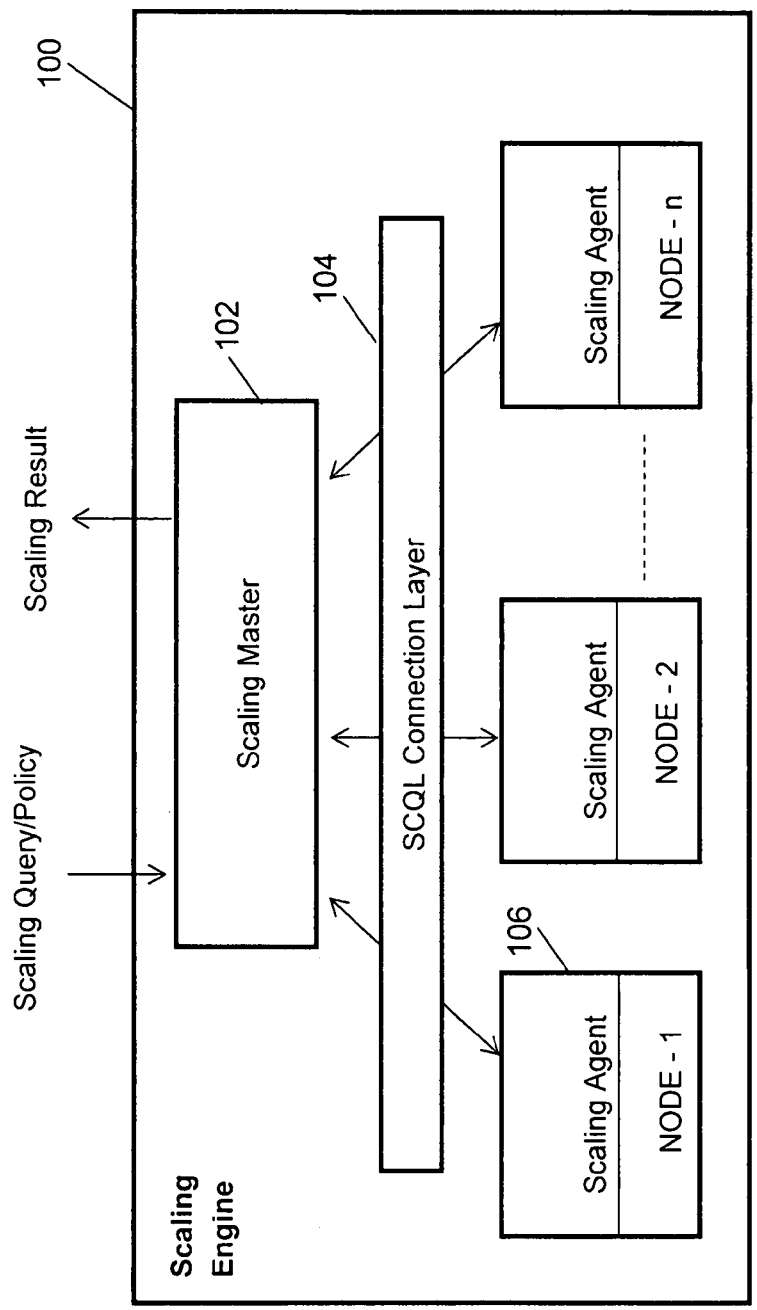
FIG. 1 is a block diagram showing a logical view of a sealing framework, in accordance certain example embodiments.

FIG. 1 is a block diagram showing a logical view of a scaling framework 100, in accordance with certain example embodiments. Scaling framework 100 includes a scaling master 102, a communication layer 104, and a plurality of scaling agents 106 communicatively coupled over a network (not shown). A user may input scaling queries and/or scaling policies to scaling master 102. The user may be an operator or a program, such as, for example, a system management application. Scaling master 102 is configured to determine and/or implement scaling commands and report corresponding scaling results to the user. Scaling master 102 and scaling agents 106 may each execute in a server, group of servers, or other computer comprising one or more processing elements and memory. Each such computer may include computer readable storage medium on which instructions for scaling master 102, scaling agents 106, and/or communication layer 104 are stored.

Communication layer 104 provides an interface for communication between scaling master 102 and the plurality of scaling agents 106. The interface provides for controlling connections and for querying/alerting.

Each scaling agent 106 receives scaling and/or alerting queries from scaling master 102 through communication layer 104, executes the queries on the corresponding processing element(s) and returns results to scaling master 102, again through communication layer 104.

Certain example embodiments allow for decoupled scaling and/or alerting decisions to be made using a query. This allows the user to change the scaling/alerting condition by modifying the query without any need to restart the agent 106 or a master 102.

Connection layer 104 is a communication mechanism between scaling master and scaling agent. Connection layer 104 has certain set of interfaces which can be implemented by developers for customization.

Connection layer 104 provides a way to make a connection to agent with given set of connection properties and execute/schedule or stop a query on the connection instance. Connection layer 104 may require request listener to be implemented by agent for receiving query/policy requests.

The response of a query that is executed once is received via callback. In the case of a scheduled query, the compile time error if any is received via callback and result(s) are streamed to the master. Connection requests for scheduling the queries based on a cron expression.

The implementation of result stream may in some instances be based on a distributed cache implementation, such as, a Terracotta Server Array. See, for example, U.S. Publication No. 2012/0222005, the entire contents of which are hereby incorporated herein by reference.

Communication layer 104 provides for scaling master 102 and scaling agent(s) 106 to communicate with each other using a structured query language. According to certain example embodiments, communication layer 104 operates in accordance with a query language, referred to as "Scaling Query Language" or SCQL, defined by the inventors. SCQL is a structured query language which represents a scaling/alerting condition either by a single scaling/alerting expression or by two or more scaling/alerting expressions grouped by a conditional operator. Example conditional operators include AND and OR. An appendix setting forth an example application programming interface (API) for SCQL is included at the end of this specification and before the claims.

According to certain SCQL embodiments, a scaling/alerting expression completely defines the metric and it's relation to threshold value. An expression is the basic unit which is evaluated by the scaling runtime.

A selection of SCQL example queries are set forth below.

A system level expression represents a metric condition to be computed for a system. Query example 1 instructs a node to vote for a scale down when its average system CPU usage is less than 56 percent for a duration of 10 seconds:

Query Example 1: DO SCALEDOWN WHEN (AVG(SYSTEM.CPU)<56 RECORDDURATION=10 METRICSOURCE=JMX[METRICSOURCEPROPS (ObjectName='java.lang:type=OperatingSystem', JmxURL='service:jmx:rmi://localhost')]);

Query example 2 shows an alternative way of specifying metric source parameters inside a properties file. By specifying them in a properties file, complex queries may appear less cluttered and more understandable.

Query Example 2: DO SCALEDOWN WHEN (AVG(SYSTEM.CPU)<56 RECORDDURATION=10 METRICSOURCE=JMX[METRICSOURCEPROPS (PROPFILE='../../jmx.properties')]);

An application level expression represents a metric condition to be computed for an application. Query example 3 shows instructs a node to vote for a scale up when application named "CricketInfo" running on it has average user requests (fetched from a web service) exceeding 100 for a quantum of 25 metric values.

Query Example 3: DO SCALEUP WHEN (AVG(APPLICATION.REQUESTS)>100 APPID='CricketInfo' RECORDENTERIES=25 METRICSOURCE=HTTPMetricProxy[METRICSOURCEPROPS (WsdlURI='../../MetricService.wsdl')]);

Another application expression is shown in Query Example 4, which instructs a node to vote for a scale up when an application named "EventProcessor" running on it has an average queue size (fetched from a messaging provider) greater than or equal to 55 for a duration of 20 seconds.

Query Example 4: DO SCALEUP WHEN (AVG(APPLICATION.QueueSize)>=55 APPID='EventProcessor' RECORDDURATION=20 METRICSOURCE=JMS [METRICSOURCEPROPS ('metric.queue'='eventqueue', 'jms.connectionfactory.lookup'='mynewconnfac', 'java.naming.factory.initial'='com.example.JmsNamingCtxFactory', 'java.naming.provider.url'='xxx://localhost:61616')]);

A complex scaling query is shown in Query Example 5, which instructs a node to vote for a scale up when maximum of system memory usage values collected for 20 seconds exceeds 200 MB and minimum of 25 responsiveness entries of application named "xBay" reaches 2 or less.

Query Example 5: DO SCALEUP WHEN (MAX(SYSTEM.MEM)>200) RECORDDURATION=20 METRICSOURCE=SigarLib) AND (MIN(APPLICATION.RESPONSIVENESS)<=2 APPID='xBay' RECORDENTERIES=20 METRICSOURCE=HTTPMetricProxy[METRICSOURCEPROPS (WsdlURI='../../MetricService.wsdl')]);

A complex scaling query is shown in Query Example 6, which instructs a node to vote for a scale up when either average of system memory recorded for 20 seconds greater than 500 MB or average of 25 requests for an application named "TestApp" exceeds 100 and average system CPU load recorded for 10 seconds exceeds 15.5%.

Query Example 6: DO SCALEUP WHEN (AVG(SYSTEM.MEM)>500 RECORDDURATION=20 METRICSOURCE=SIGARLIB OR AVG(APPLICATION.REQUESTS)>100 APPID='TestApp' RECORDENTERIES=25 METRICSOURCE=JMX[METRICSOURCEPROPS('ObjectName'='com.test.bean: type=SimulatorMXBean', 'JmxURL'='service:jmx: rmi:///jndi/rmi://xxx')]) AND (AVG(SYSTEM.CPU) >15.5 RECORDDURATION=10

METRICSOURCE=HTTPMETRICPROXY[METRIC-SOURCEPROPS('WsdlURL'=='file:///C:\MetricService.wsdl')]);

Query Examples 7-9 illustrates alerting queries. Query Example 7 instructs a node to issue a critical alert when an average system CPU usage is greater than 95% for a duration of 60 seconds.

Query Example 7: DO ALERT AS CRITICAL WHEN (AVG(SYSTEM.CPU)>95 RECORDDURATION=60 METRICSOURCE=JMX[METRICSOURCEPROPS (ObjectName='java.lang:type=OperatingSystem', JmxURL='service:jmx:rmi://localhost')]);

Query Example 8 instructs a node to issue a warning alert when average of 25 user requests (fetched from a web service) exceeds 80 for an application named "CricketInfo" running on it.

Query Example 8: DO ALERT AS WARNING WHEN (AVG(APPLICATION.REQUESTS)>80 APPID='CricketInfo' RECORDENTERIES=25 METRICSOURCE=HTTPMetricProxy[METRICSOURCEPROPS (WsdlURI='../../MetricService.wsdl')]);

Query Example 9 instructs a node to issue a warning alert when average of 50 "MyMetric" (fetched from a custom metric source) exceeds 20 for an application named "TestApp" running on it.

Query Example 9: DO ALERT AS WARNING WHEN (AVG(APPLICATION.MyMetric)>20 APPID='TestApp' RECORDENTERIES=50 METRICSOURCE='MyMetricSource'[METRICSOURCEPROPS ('MetricClass'='sample.MyMetricSourceImpl', PROPFILE='../../mymetricsrc.properties')]).

The table below sets forth certain tokens defined in SCQL.

| SCQL TOKENS | DESCRIPTION |
| --- | --- |
| AVG | Function that computes average of all metric values. |
| MAX | Function that returns the maximum of all metric values. |
| MIN | Function that returns the minimum of all metric values. |
| SYSTEM.<Metric Name> | Fully qualified name of a metric that is evaluated at the system level, e.g., CPU, Memory, etc. |
| APPLICATION.<Metric Name> | Fully qualified name of a metric that is evaluated at the application level, e.g., user requests, database load, etc. |
| APPID | Unique identifier of an application running on a node/instance. |
| RECORDDURATION | Record the metric values for specified duration in seconds. |
| RECORDENTERIES | Record the specified number of metric values. |
| METRICSOURCEPROPS | Configuration properties for a given metric source required for successfully retrieving the metric value. |
| PROPFILE | Token representing FQN of a file containing metric source properties. |
| CRITICAL | Alarm/Alert severity as critical. |
| WARNING | Alarm/Alert severity as warning. |
| NORMAL | Alarm/Alert severity as normal. |
| SCALEUP | Represents an action of voting for scale up. |
| SCALEDOWN | Represents an action of voting for scale down. |
| ALERT | Represents an action of alerting. |

In certain example embodiments, scaling and/or alerting policies may be defined. A scaling policy or a file contains scale up and/or scale down condition per node/instance. Different scaling conditions may be provided for different nodes/instances, in some cases. FIG. 10 illustrates an example policy file in accordance with certain example embodiments.

An alerting policy or a file may contain an alert condition per node/instance. Different alert conditions may sometimes be provided for different nodes/instances, in some cases. FIG. 11 illustrates an example policy file for alerts in accordance with certain example embodiments.

Scaling master 102 triggers scaling and/or alerting computation on each of the configured nodes/instances. In the case of scaling queries or a policy, the scaling master sums up the query results based on a summation policy, and if the conclusion is to scale down, it returns the list of the nodes/instances to be scaled down based on an eviction policy along with the concluded result.

The summation may be in accordance with a voting scheme. In certain example embodiments, the default summation policy or algorithm is fair voting and majority wins, in that (for example) it counts the number of scale up votes and scale down votes and greater of the two (majority) is the concluded result.

A default eviction policy or algorithm may first calculate the number of nodes say n to be scaled down in order to maintain a desired load by taking into account computed average load. The nodes are ranked among their peers based on weighted average load and finally evicting the least n ranked nodes. For instance:

1. Calculating no. of nodes to scale down:

$$n = \left(\frac{L(t) - L}{L}\right) * N$$

2. Calculating the weighted average load:

$$L_{wvg}(t) = \frac{\sum_{i=1}^{N}(w_i * L_i(t))}{\sum_{i=1}^{N} w_i}$$

3. Ranking the nodes:

$$\text{rank}(M_{id \to L_i}^N, L_{wvg}(t)) \xrightarrow{yields} Lst_{id}$$

The table below sets forth some of the acronyms and other terminology used in the equations above.

| Notation | Description |
| --- | --- |
| N | Number of nodes to be scaled down. |
| L(t) | Average load of the system computed at time t. |
| L | Desired load of the system. |
| N | Number of nodes at present. |
| $L_{wvg}(t)$ | Weighted average load of the system at time t. |
| $L_i(t)$ | Load of the ith node at time t. |
| $w_i$ | Weight/Capacity of the ith node. |
| $M_{id \to L_i}^N$ | Map of N nodes to their respective loads. |
| $Lst_{id}$ | List of ranked nodes. |

Custom summation and/or eviction policy algorithms can be plugged-in by implementing certain interfaces and setting them in a file such as, for example, the master configuration file.

Scaling master components connect to scaling agent using SCQL connection layer, executes/schedules queries on it, etc. In the case of scaling queries/policy, it collects and concludes the query results based on summation policy. Also, if the conclusion is a scale down, it provides back the list of nodes to be scaled down based on eviction policy.

In the case of scheduling a query, the scaling master gets the handle to a stream structure, such as SCQLResultStream. It may then wait for callback invocation to check if query execution is successful. If successful, it then waits for result data to be available in the stream and then fetch the results available from the stream in a waited loop until a job is completed or query has been stopped. The scaling master also has a flow control and feedback control mechanism (e.g., FAXLCM described below) for scheduled queries.

Given a scenario where a scaling query is to be scheduled on a node, e.g., Node A, to run for every x minutes, the scaling master can ensure that it provides controlled scaling decision(s).

For addressing scenarios such as those discussed above, the scaling master may include a closed loop flow control mechanism or an open loop flow control mechanism. The inventors have configured an example component referred to as FAXLCM, Flow And X Loop Control Mechanism, X represents the mode of operation, in this regard. FAXLCM may be operated as either a closed loop or an open loop system.

Figure 2:
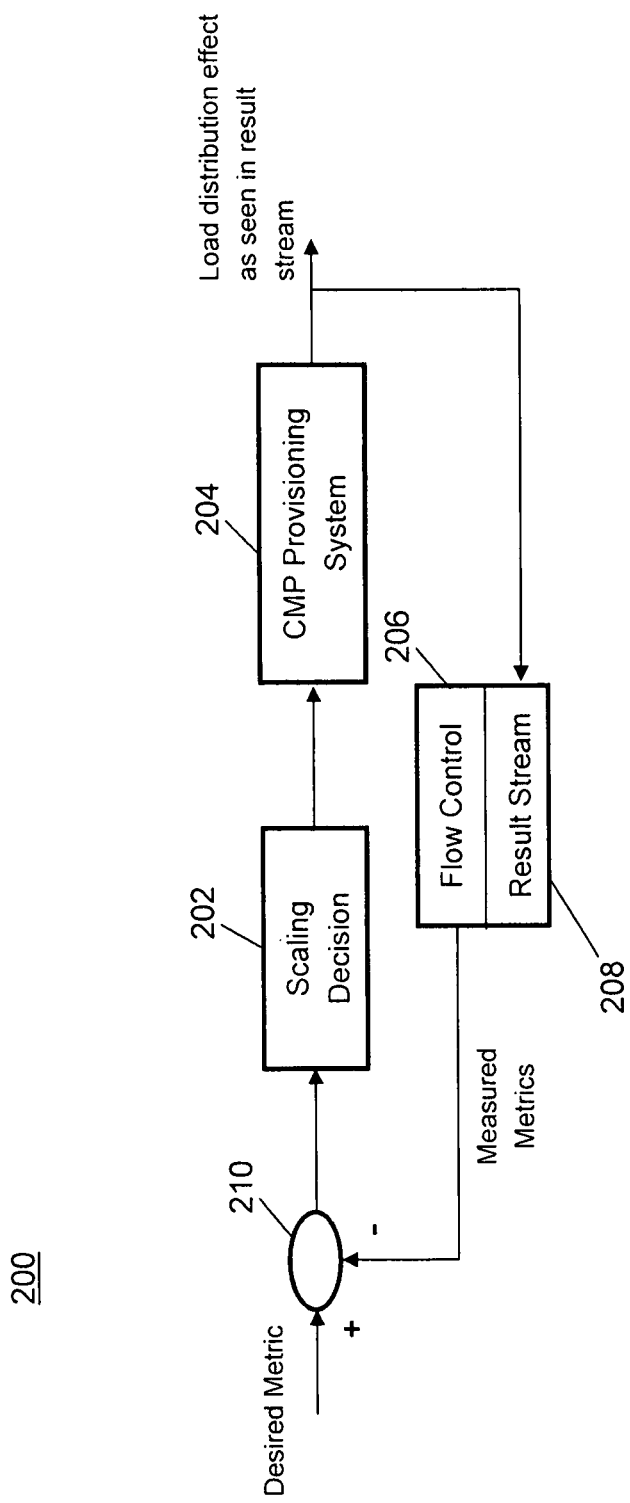
FIG. 2 illustrates a closed loop flow control, in accordance with certain example embodiments.

A closed loop control system forms the decision to scale up/down or to defer/discard it in a way to minimize the deviation between desired metric value and average of measured metric value(s). An example closed loop flow and loop control system 200 is shown in FIG. 2. The output of a scaling decision 202 is provided as input to a provisioning system 204. Provisioning system 204 implements the scaling decision in a system. The output of provisioning system 204 is provided in a result stream 208. The result stream may be observed to determine the effect of the scaling decision. Basically, a provisioning system (an external component) is the capability of a (cloud) management platform to provision (adds) into the topology and decommission (removes) a virtual machine/instance or a computation node from the topology. So the output of provisioning system results in the change in topology for example increase or decrease in the number of web servers hosting an application and hence the changes in load distribution patterns whose effect can be observed in result stream.

The result stream may be used to measure metrics. A flow control 208 determines one or more measured metrics from the result stream at certain intervals. The measured metrics are then compared 210 with the desired metrics, and the result of the comparison is provided to the scaling decision operation 202. According to certain example embodiments, scaling decision operation 202 makes a scaling decision based on input including the difference between the desired metric and measured metric.

An open loop control system may use measured variables like threshold value rather than feedback information to make a decision. The decision to report scale up/down or to discard/defer it is based on threshold period or cool off period.

Figure 3:
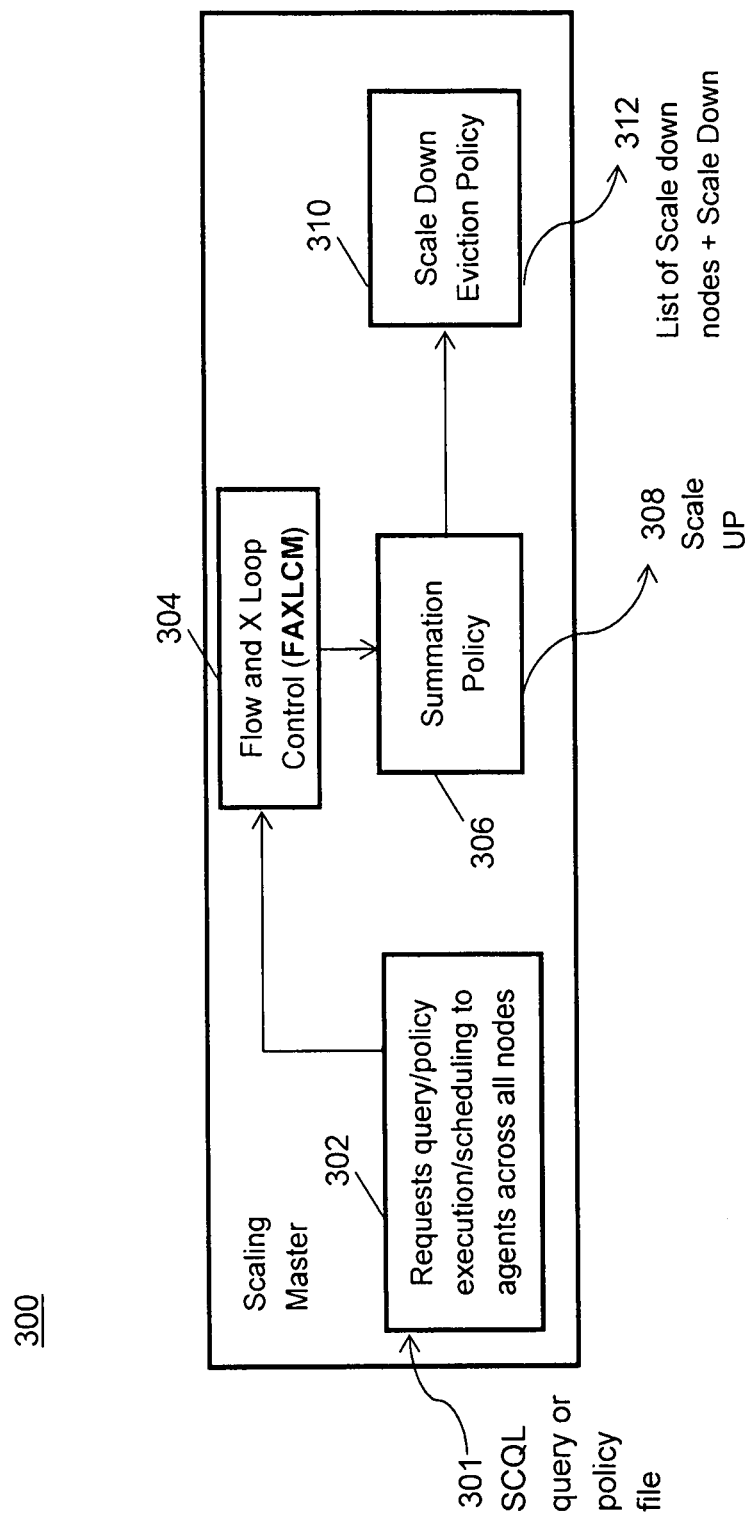
FIG. 3 illustrates an open loop flow control, in accordance with certain example embodiments.

Scaling master 300 shown in FIG. 3 illustrates an FAXLCM 304 operating in open loop mode, in accordance with an embodiment. FAXLCM 304 receives a stream of information every x minutes in the form of query results from query scheduling and execution 302, which receives as input queries or a query policy file 301. A flow control aspect of FAXLCM 304 collects the latest available n entries in intervals and sends them to a summation policy 306 to conclude the query result (e.g., a scale down or a scale up). A cool off period may become active after each scaling conclusion is drawn.

Within the cool off or threshold period any scaling decisions made may be discarded (or deferred). This may be necessary to avoid undesirable scaling up/down of the system.

The cool off or threshold period is time for the system to reach from an oscillating state caused due to scale up/down to the point of equilibrium.

According to certain example embodiments, the threshold period is set by summing the following: amount of time required to provision/decommission instance, amount of time required to distribute load among new set of nodes, and amount of time required to see the effect of load sharing on Node A's metric.

Summing policy 306 outputs a scale up decision 308 or a scale down decision 310. If a scale down decision 310 is made, then a list of nodes to scale down 312 may also be generated by scaling master.

Figure 4:
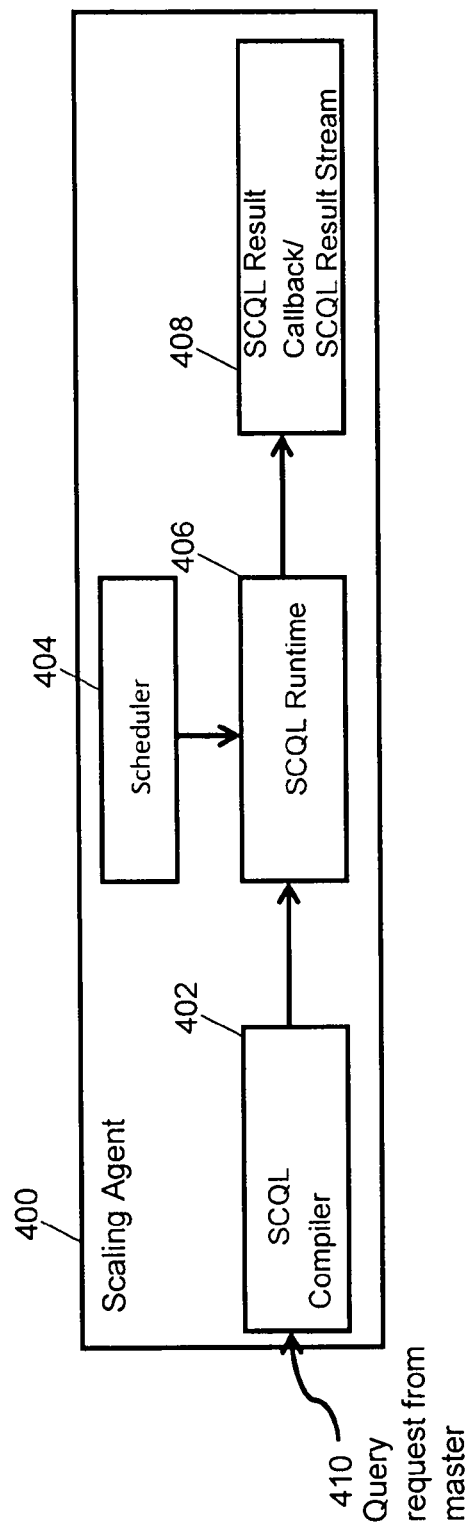
FIG. 4 illustrates a block diagram of a scaling agent, in accordance with certain example embodiments.

FIG. 4 illustrates a block diagram of a scaling agent 400 that runs on each of the configured nodes/instances in accordance with certain example embodiments. Scaling agent 400 receives the scaling/alert queries from the scaling master. The received query can be executed or scheduled on the scaling agent 400. The received query may be in a policy configuration file.

The query received 410 is then compiled by the SCQL compiler 402 and either submitted to the runtime 406 directly for execution or to a scheduler 404 first which then requests the runtime 406 based on a configured cron expression.

The result of the query that is executed is returned back to the master via SCQL callback 408 whereas the scheduled query results are streamed via SCQL result stream.

Scaling agent 400 returns the unique identifier for scheduled query to scaling master as a success response. The master can later request that the query stop using this identifier. SCQL compiler 402 may perform lexical and syntax analysis prior to compiling. In certain example embodiments, ANTLR runtime is included in SCQL compiler 402 for performing lexical analysis. AST is then transformed into an XML by semantic analyzer and this XML is converted into a composite by a code generator. The composite, which contains scaling expressions grouped by conditional operator, is a final form of the compiled query that is executed by a SCQL Runtime 404.

Composite evaluator, which is a component of SCQL runtime 406, understands the expression and translates it into event processing language and submits it to event processor. Composite evaluator listens to CEP statement state change notifications whose data provides expression result. The expression result may be logically (e.g., AND/OR) compared to another expression's result which is at the same level and moves up until final result is extracted. Once the final result is available call back is issued to the master by the agent as per SCQL connection specification.

In the case of scheduled query, the scaling agent registers the compiled query against a unique identifier and submits it to the scheduler 404. The scheduler understands the given cron expression and schedules the compiled query into a job, the job run as per cron configuration. The job periodically initializes the runtime composite evaluator and streams the query results into SCQLResultStream 408.

IF case a scheduled job is completed, scaling agent sets the status of stream parameters as seen by scaling master such that, for example, job completed=true, data available in stream=false, etc.

If a runtime error occurs, the agent injects the error into the stream to be retrieved by master and act accordingly, and scaling agent also set the status of "job completed" parameter to true.

In case scaling agent receives the request to stop the query, scaling agent checks if provided query id is valid. If the id is valid, then de-register the query and cancel the scheduler job running. It has the same effect as job completion as seen by master.

FIG. 5 is a code listing 502 of a scaling agent, such as scaling agent 106, for executing a received query, in accordance with certain example embodiments. Code listing 502, includes, among other things, code 504 for compiling the query received, for example, from scaling master, and code 506 for executing the compiled query on the local node.

FIG. 6 is a code listing 602 of a program, or part of a program, to cause the scaling master to execute a query at the scaling location, in accordance with certain example embodiments. Code listing 602 includes code for defining connection information 604, defining a scaling and/or alerting query 606, connecting to a SCQL scaling agent based on the specified connection properties 608, and executing the query (or compiled version of the received query) on the scaling agent to which the connection was established 610.

FIG. 7 is a code listing 702 of a program, or part of a program, for causing the scheduling of a query at the scaling location, in accordance with certain example embodiments. Code listing 702 includes code 704 for using a defined connection to schedule the scaling and/or alerting query, and code 706 for waiting for the result to be available in a data stream. The waiting for the result to be available may include using flow control.

FIG. 8 illustrates a code listing 802 of code for the scaling master to stop a query executing on a scaling agent, using a query identifier, in accordance with certain example embodiments. As noted above, when a scaling agent schedules a query, it may return a query identifier associated with the query. The query identifier may be used to stop the execution of the query later by the scaling master.

Figure 9:
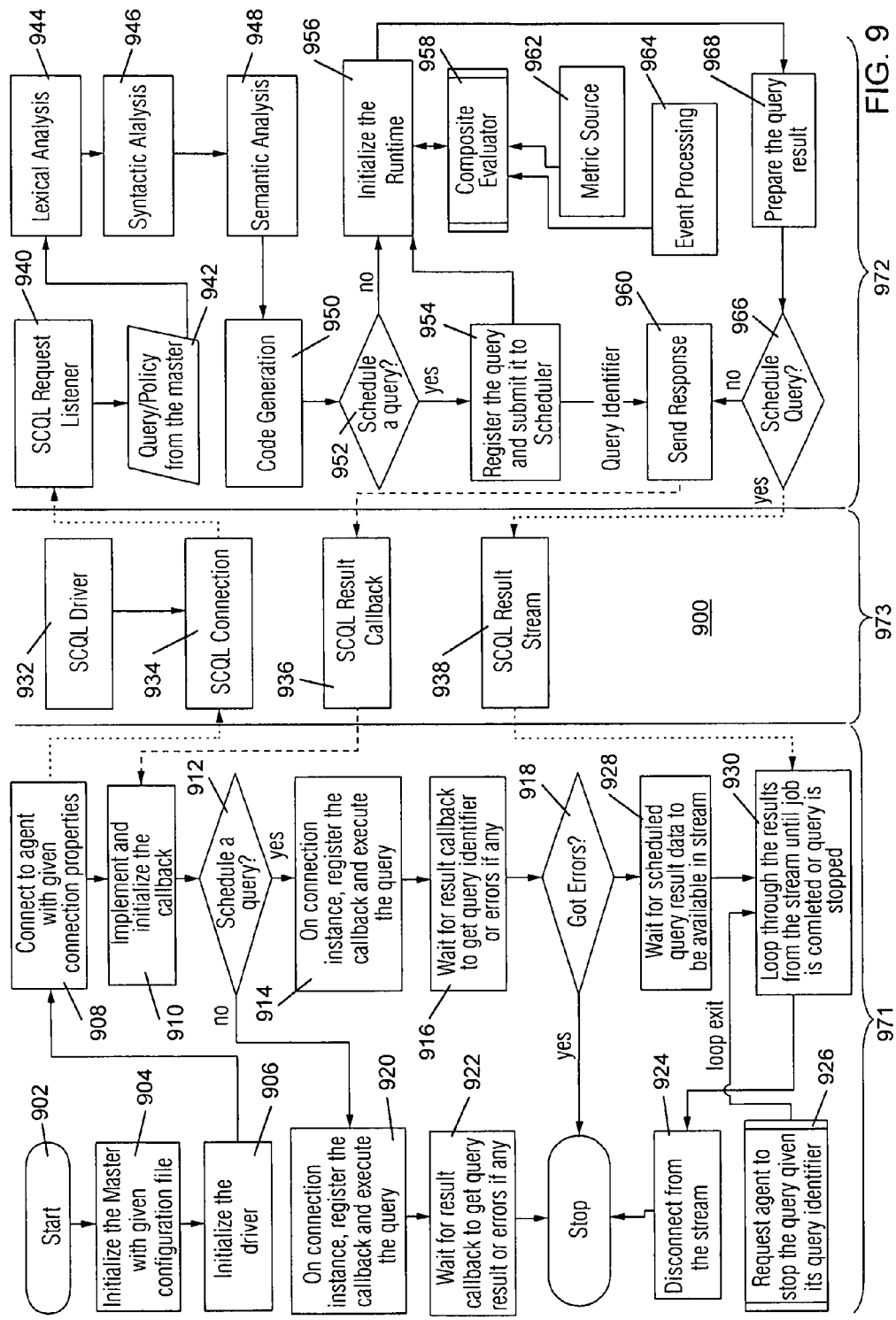
FIG. 9 is a flowchart for an example method for scaling and/or alerting in accordance with certain example embodiments.

FIG. 9 is a flowchart for an example method 900 for scaling and/or alerting in accordance with certain example embodiments. Although method 900 is illustrated with operations 902-960, one or more of the operations may 902-960 may not be performed, performed in an order different than shown, or may be performed with modifications.

Method 900 illustrates communication between the scaling master, scaling agents, and the connection layer. Operations illustrated in the 971 column are those performed by scaling master; operations in 972 are performed by scaling agents; and those in 973 are performed by the connection layer.

After entering the method at 902, the scaling master is initialized with a given configuration file at 904. The configuration file may include connection information for the scaling agents. The configuration file may also include one or more user-specified queries, such as, for example, any of the query examples discussed above.

At operation 906, a driver for communicating using the connection layer is initialized for the scaling master.

At operation 908, the scaling master connects to one or more scaling agents based on the connection properties of the agents, and the required connection properties as set forth in the corresponding entries in the configuration file.

Also at operation 908, a scaling and/or alerting query is transmitted to the connected one or more agents. At this time, scaling agents are listening at operation 940 for incoming query requests. The connection between master and agent(s) is provided by the connecting layer 973. For example, the connecting layer initializes a driver (e.g., SCQL driver) 924 and creates the SCQL connection 934 for use for communication between the scaling master and agents.

At operation 910, a callback is implemented and initialized for receiving the results of the query. At operation 912, it is determined whether the query is scheduled for future execution or being executed immediately.

If the query is to be scheduled, then at operation 914, the query is scheduled and a call back 936 is registered at the connection instance. At 916, the scaling master waits for the responses to the query via call back media.

If the results received at 916 include errors as determined by operation 908, then the processing at the scaling master stops.

If on the other hand, at 912 it was decided not to schedule the query, then method 900 proceeds to 920. At operation 920, a call back is registered and the query is executed on the connection instance.

At operation 922, the results of the query are obtained, and the processing by the scaling master stops.

If on the other hand at 918, it was determined that no errors were present, then method 900 proceeds to operation 928. At operation 928 the scaling master waits for query results to be available in a result stream.

At operation 930 the results in the stream 938 are looped through until the job is completed or query is stopped.

At operation 924, the scaling master disconnects from the stream.

Operation 926 illustrates requesting agent to stop the query, given the query identifier obtained when the query was implemented at the agent.

At the agent, after the listener detected the SCQL connection at 940 and received the query and/or policy from the master at operation 942, the query is subjected to lexical 944, syntax 946, and semantic analysis 948, before being compiled and code generated at 950.

At operation 952, it is determined whether the query is to be scheduled. If yes, at operation 954, the query is registered and submitted to the scheduler.

At operation 956, the SCQL runtime is initialized. Composite evaluator 958, with input from metric source 962 and event processing 964 execute the query. The query result is prepared at operation 968.

At operation 966, it is determined either that the result is to be forwarded to the stream 938, or that the result is to be provided to the master via the callback 936.

The description above with respect to method 900 illustrates communication between the scaling master, scaling agents and the connection layer.

Figure 12:
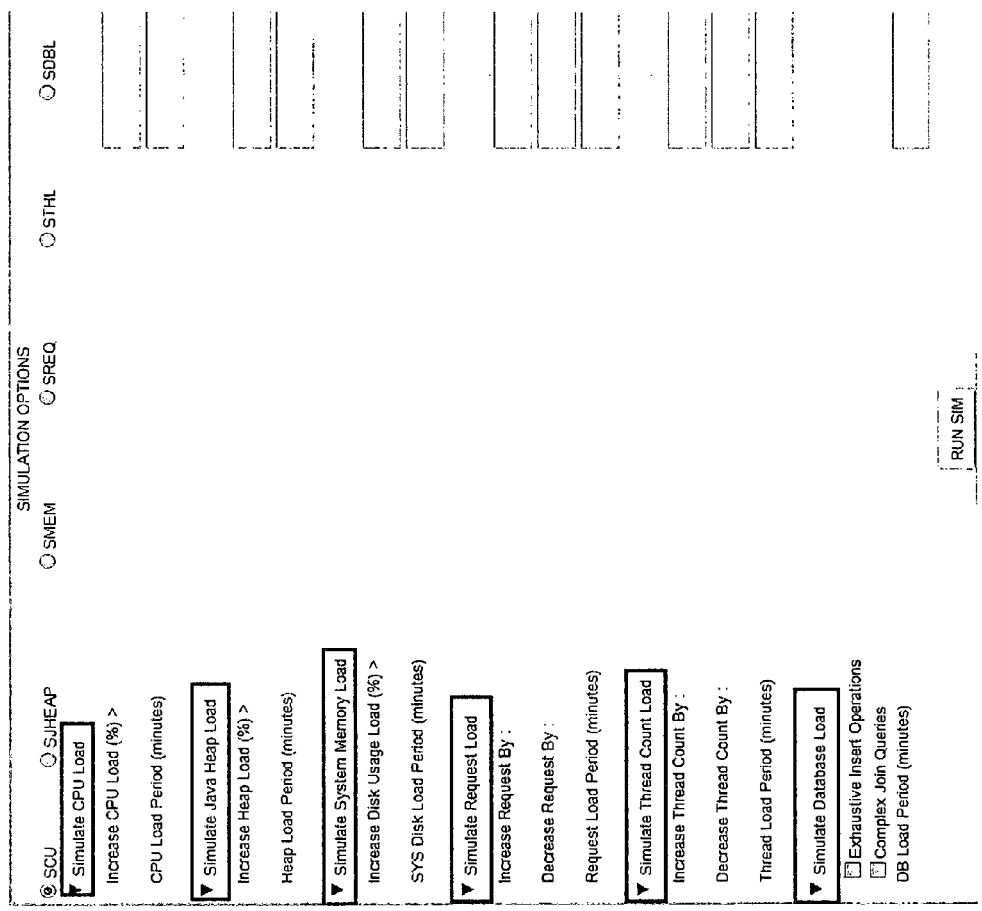
FIG. 12 illustrates a simulation tool, in accordance with certain example embodiments.

FIG. 12 illustrates a front of a testing tool that has been developed to test the system described above in accordance with certain example embodiments. The tool may be used to simulate the Java heap load, system memory load, request load, thread count load, and database load. FIGS. 13 and 14 illustrate code snippets corresponding to selected simulations in accordance with certain example embodiments.

A description of certain terms is provided below for aiding in the understanding of how certain example embodiments may operate. However, it is to be understood that the following descriptions are provided by way of example for explanatory purposes and should not be construed as being limiting on the claims, unless expressly noted.

| Term | Example Description |
| --- | --- |
| AST | Abstract Syntax Tree |
| AWS | Amazon Web Services |
| CEP | Complex Event Processor |
| XML | Extensible Markup Language |
| ANTLR | Another Tool for Language Recognition |
| SCQL | Scaling Query Language |
| CMP | Cloud Management Platform |
| SIGAR | System Information Gatherer and Reporter |
| JMX | Java Management Extensions |
| JMS | Java Message Service |
| GWT | Google Web Toolkit |
| FQN | Fully Qualified Name |
| More on Rightscale | http://www.rightscale.com/ |
| More on Scalr | http://www.scalr.com/ |
| Terracotta Big Memory | A feature that allows large (and possibly serializable) objects to be stored in an off-heap memory cache. The use of Terracotta's Big Memory feature may be used in connection with the parsed data store of certain example embodiments. |

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

An example API for Scaling Query Language is set forth below.

What is claimed is:

1. A scalable system having a plurality of communicatively-coupled processing elements, the system comprising:
a scaling master, the scaling master and the processing elements being backed by respective computer systems having respective hardware processors and memories;
a plurality of scaling agents, each scaling agent at a respective one of the plurality of communicatively-coupled processing elements; and
a connection layer providing one or more interfaces for communication between the scaling master and the plurality of scaling agents over a network,
wherein the scaling master is configured to transmit, using the connection layer, at least one user-specified scaling and/or alerting query to said each scaling agent,
wherein said each scaling agent is configured to execute the at least one scaling and/or alerting query received from the scaling master, and to report, using the connection layer, a result of the execution to the scaling master, and
wherein the scaling master is further configured to receive each said reported result and to form a scaling decision by selectively aggregating the received results, the selective aggregation of the received results being based on a flow control operation.

2. The scalable system as in claim 1, wherein the scaling master is further configured to receive the at least one scaling and/or alerting query from a user input device or from a configuration file.

3. The scalable system as in claim 1, wherein the at least one scaling and/or alerting query combines plural scaling and/or alerting expressions using one or more conditional operators.

4. The scalable system as in claim 1, wherein the scaling master is further configured to transmit one or more scaling commands based on the formed scaling decision to respective ones of the plurality of scaling agents.

5. The scalable system as in claim 1, wherein the flow control is a closed loop flow control, and wherein the scaling decision is further based on reducing a difference between a configured desired metric and a measured metric determined from the selected results.

6. The scalable system as in claim 1, wherein the flow control is an open loop flow control, and wherein the scaling decision is further based on a configured number of reported results selected during a first predetermined time interval, respective first predetermined time intervals being separated by a second predetermined time interval.

7. The scalable system as in claim 1, wherein the aggregating is performed in accordance with a configurable policy.

8. The scalable system as in claim 1, wherein the connection layer is operable in accordance with a structured query language, and wherein the at least one scaling and/or alerting query is specified in the structured query language.

9. The scalable system as in claim 1, wherein each said scaling agent is further configured to compile the received at least one scaling and/or alerting query, and to execute the compiled query.

10. The scalable system as in claim 1, wherein the scaling agent is further configured to schedule the at least one scaling and/or alerting query for subsequent execution at a specified time, wherein the executing of the scheduled at least one scaling and/or alerting query occurs subsequently at the specified time.

11. A scalable system having a plurality of communicatively-coupled processing elements, the system comprising:
a scaling master, the scaling master and the processing elements being backed by respective computer systems having respective hardware processors and memories;
a plurality of scaling agents, each scaling agent at a respective one of the plurality of communicatively-coupled processing elements; and
a connection layer providing one or more interfaces for communication between the scaling master and the plurality of scaling agents over a network,
wherein the scaling master is configured to transmit, using the connection layer, at least one user-specified scaling and/or alerting query to said each scaling agent,
wherein said each scaling agent is configured to execute the at least one scaling and/or alerting query received from the scaling master, and to report, using the connection layer, a result of the execution to the scaling master, wherein the scaling master is further configured to receive each said reported result and to form a scaling decision based on the received results, and wherein the scaling master is configured to form the scaling decision by performing operations including:
calculating a number of processing elements to be evicted to maintain a desired load, the calculating being based on an average load in the processing elements;
ranking the processing elements in accordance with a weighted average load; and
selecting the processing elements to be evicted in accordance with the ranking.

12. A scalable system having a plurality of communicatively-coupled processing elements, the system comprising:
a scaling master, the scaling master and the processing elements being backed by respective computer systems having respective hardware processors and memories;
a plurality of scaling agents, each scaling agent at a respective one of the plurality of communicatively-coupled processing elements; and
a connection layer providing one or more interfaces for communication between the scaling master and the plurality of scaling agents over a network,
wherein the scaling master is configured to transmit, using the connection layer, at least one user-specified scaling and/or alerting query to said each scaling agent,
wherein said each scaling agent is configured to execute the at least one scaling and/or alerting query received from the scaling master, and to report, using the connection layer, a result of the execution to the scaling master,
wherein the scaling master is further configured to receive each said reported result and to form a scaling decision based on the received results, and
wherein the scaling master is further configured to transmit a command to stop the executing of the at least one scalability and/or alerting query, and wherein the command includes an identifier for the at least one scaling and/or alerting query.

13. A method for scaling a processing system having a plurality of communicatively coupled processing elements, comprising:
receiving, by a scaling master, a user-specified scaling and/or alerting query;
transmitting, using a connection layer, by the scaling master, the scaling and/or alerting query to scaling agents at respective ones of the plurality of processing elements;
causing each of the scaling agents to execute the at least one scaling and/or alerting query transmitted thereto;
receiving, over the connection layer, from each of the scaling agents, a result of the executing, at the scaling master; and
forming, by the scaling master, a scaling decision by selectively aggregating the received results, the selective aggregation of the received results being based on a flow control operation.

14. The method as in claim 13, further comprising transmitting, by the scaling master, one or more scaling commands based on the formed scaling decision to respective ones of the plurality of scaling agents.

15. The method as in claim 13, wherein the connection layer is operable in accordance with a structured query language, and wherein the at least one scaling and/or alerting query is specified in the structured query language.

16. A non-transitory computer readable storage medium storing instructions thereon, the instructions, when executed by plural computers of a processing system, causes the plural computers to perform operations comprising:
receiving, by a scaling master, a user-specified scaling and/or alerting query;
transmitting, through a connection layer, by the scaling master, the scaling and/or alerting query to scaling agents at respective ones of the plurality of processing elements;
causing each of the scaling agents to execute the at least one scaling and/or alerting query transmitted thereto;
receiving, over the connection layer, from each of the scaling agents, a result of the executing at the scaling master; and
forming, by the scaling master, a scaling decision by selectively aggregating the received results, the selective aggregation of the received results being based on a flow control operation.

17. The non-transitory computer readable storage medium of claim 16, further comprising instructions to at least transmit one or more scaling commands based on the formed scaling decision to respective ones of the plurality of scaling agents.

18. The non-transitory computer readable storage medium of claim 16, wherein the aggregating is performed in accordance with a configurable policy.

19. The non-transitory computer readable storage medium of claim 16, wherein the connection layer is operable in accordance with a structured query language, and wherein the at least one scaling and/or alerting query is specified in the structured query language.

20. The non-transitory computer readable storage medium of claim 16, further comprising instructions causing the scaling agent to schedule the at least one scaling and/or alerting query transmitted thereto for subsequent execution at a specified time, wherein the executing of the scheduled at least one scaling and/or alerting query occurs subsequently at the specified time.

* * * * *